(12) United States Patent
Park et al.

(10) Patent No.: US 12,304,347 B2
(45) Date of Patent: May 20, 2025

(54) ELECTRIFIED VEHICLE AND METHOD OF CONTROLLING THE SAME

(71) Applicants: Hyundai Motor Company, Seoul (KR); Kia Corporation, Seoul (KR)

(72) Inventors: Sung Uk Park, Busan (KR); Hyun Wook Seong, Anyang-si (KR); Dong Gyun Woo, Hwaseong-si (KR); Jae Hyun Kim, Incheon (KR); Hui Sung Jang, Hwaseong-si (KR); Jee Heon Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 203 days.

(21) Appl. No.: 17/980,076

(22) Filed: Nov. 3, 2022

(65) Prior Publication Data

US 2023/0339362 A1 Oct. 26, 2023

(30) Foreign Application Priority Data

Apr. 29, 2022 (KR) .................. 10-2022-0053772

(51) Int. Cl.
*B60L 53/22* (2019.01)
*B60L 58/15* (2019.01)
*H02J 7/00* (2006.01)

(52) U.S. Cl.
CPC ............... *B60L 58/15* (2019.02); *B60L 53/22* (2019.02); *H02J 7/00304* (2020.01);
(Continued)

(58) Field of Classification Search
CPC ...... B60L 58/15; B60L 53/22; B60L 2210/10; B60L 2240/526; B60L 2240/527;
(Continued)

(56) References Cited

U.S. PATENT DOCUMENTS

2011/0215649 A1* 9/2011 Min ................ H02J 3/381
307/72
2012/0292989 A1* 11/2012 Kim .................. H02M 3/3376
307/10.1

(Continued)

FOREIGN PATENT DOCUMENTS

KR 20210042559 A 4/2021
KR 20210156107 A 12/2021

*Primary Examiner* — Elim Ortiz
(74) *Attorney, Agent, or Firm* — SLATER MATSIL, LLP

(57) ABSTRACT

An electrified vehicle includes an inverter to convert a DC voltage of an input terminal into an AC voltage based on a PWM control signal to output the AC voltage to an output terminal, an inverter controller to control a duty ratio of the PWM control signal in order to adjust a level of the AC voltage to a level of a target voltage, and a battery controller to determine whether an overcurrent is generated based on a maximum instantaneous current output from the output terminal of the inverter in a battery power output mode and terminate the battery power output mode when the overcurrent is generated, determine whether to re-enter the battery power output mode based on the number of overcurrent generations when the battery power output mode is terminated, and set the level of the target voltage in response to the number of overcurrent generations upon re-entering.

10 Claims, 6 Drawing Sheets

(52) U.S. Cl.
CPC ....... *H02J 7/00711* (2020.01); *H02J 7/00712* (2020.01); *B60L 2210/10* (2013.01)

(58) Field of Classification Search
CPC ......... B60L 2240/529; B60L 2240/547; B60L 2240/549; H02J 7/00304; H02J 7/00711; H02J 7/00712; H02J 7/00306; H02J 7/00302; H02J 7/0031; H02J 2207/20; H02M 7/5395; B60Y 2200/91; B60Y 2200/92; Y02E 60/10; Y02T 10/70; G01R 31/3842; G01R 31/3648
USPC ......... 180/65.265, 65.21; 320/164, 140, 118, 320/109, 136, 132, 134; 307/10.7, 9.1
See application file for complete search history.

(56) References Cited

U.S. PATENT DOCUMENTS

| | | | |
|---|---|---|---|
| 2021/0184619 A1* | 6/2021 | Park | .................. H02P 29/027 |
| 2021/0399628 A1 | 12/2021 | Yeo et al. | |
| 2023/0038790 A1* | 2/2023 | Ling | .................. B60L 58/27 |

\* cited by examiner

FIG. 1

| ITEMS | MAXIMUM INSTANTANEOUS CURRENT (Apeak) | BATTERY POWER OUTPUT MODE MAINTENANCE TIME |
|---|---|---|
| 1 | RATED CURRENT x 110% < Apeak ≤ RATED CURRENT x 150% | 1s |
| 2 | RATED CURRENT x 150% < Apeak ≤ PROTECTION SPECIFICATION VALUE | 500ms |
| 3 | PROTECTION SPECIFICATION VALUE < Apeak | IMMEDIATE TERMINATION |

FIG. 5

| K | $V_{ac\_target}$ |
|---|---|
| 0 | $V_{ac\_set}<0>$ |
| 1 | $V_{ac\_set}<1>$ |
| 2 | $V_{ac\_set}<2>$ |
| 3 | 0(CONFIRM OVERCURRENT GENERATION DIAGNOSIS) |

ELECTRIFIED VEHICLE AND METHOD OF CONTROLLING THE SAME

CROSS-REFERENCE TO RELATED APPLICATIONS

This application claims the benefit of Korean Patent Application No. 10-2022-0053772, filed on Apr. 29, 2022, which application is hereby incorporated herein by reference.

TECHNICAL FIELD

The present disclosure relates to an electrified vehicle and a method of controlling the same.

BACKGROUND

Recently, with the global trend of reducing carbon dioxide emissions, the demand for electrified vehicles that generate traveling power by driving a motor with electric energy stored in an energy storage device such as a battery instead of typical internal combustion engine vehicles that generate traveling power through combustion of fossil fuels is increasing significantly.

As an example of the electrified vehicles, electric vehicles are provided with a battery configured to store electric energy supplied to a motor configured to generate traveling power of a vehicle, and a battery charging device configured to convert external power into power used for charging the battery in order to charge the battery.

Recently, as the capacity of a battery provided in the electric vehicles increases, a vehicle to load (V2L) (hereinafter, referred to as a battery power output mode) technology of supplying power of the vehicle battery to an electric load using a battery charging device needs to be developed.

In general, the battery charging device stops an operation of outputting the power of the battery to the electric load when a rush current is generated in an initial starting situation or an instantaneous overcurrent is generated during operation when power of a vehicle battery is supplied to the electric load.

The matters explained as the background art are for the purpose of enhancing the understanding of the background of embodiments of the present disclosure and should not be taken as acknowledging that they correspond to the related art already known to those skilled in the art.

SUMMARY

The present disclosure relates to an electrified vehicle and a method of controlling the same. Particular embodiments relate to an electrified vehicle, which responds to an overcurrent generated when a battery power is output to an external device, and a method of controlling the same.

Accordingly, an embodiment of the present disclosure adjusts an output voltage of a battery charging device to re-enter a battery power output mode and then restores the output voltage in terminating the battery power output mode because an overcurrent is generated in the battery charging device in the battery power output mode, thereby performing the battery power output mode even when the overcurrent is generated in the battery charging device.

The embodiments of the present disclosure are not limited to the above-described embodiments, and other embodiments not mentioned will be clearly understood by those skilled in the art to which the present disclosure pertains from the following description.

According to one embodiment of the present disclosure, there may be provided an electrified vehicle including an inverter configured to convert a DC voltage of an input terminal into an AC voltage based on a pulse width modulation control signal to output the AC voltage to an output terminal, an inverter controller configured to control a duty ratio of the pulse width modulation control signal in order to adjust a level of the AC voltage to a level of a target voltage based on a target voltage, and a battery controller configured to determine whether an overcurrent is generated based on a maximum instantaneous current output from the output terminal of the inverter in a battery power output mode, to terminate the battery power output mode when the overcurrent is generated, to determine whether to re-enter the battery power output mode based on the number of overcurrent generations when the battery power output mode is terminated, and to set the level of the target voltage in response to the number of overcurrent generations upon re-entering.

In one example, the inverter controller may control the duty ratio of the pulse width modulation control signal based on a result of comparing the level of the target voltage and the level of the AC voltage.

In one example, the battery controller may set the level of the target voltage to be lower as the number of overcurrent generations increases.

In one example, the battery controller may determine that the overcurrent has been generated when the maximum instantaneous current output from the output terminal of the inverter exceeds a preset value in the battery power output mode and up-count the number of overcurrent generations.

In one example, when the number of overcurrent generations is larger than the initial number of times in the battery power output mode, the battery controller may down-count the number of overcurrent generations whenever a state in which the maximum instantaneous current output from the output terminal of the inverter is the preset value or less for a set time interval is maintained.

In one example, when the battery power output mode is terminated, the battery controller may re-enter the battery power output mode when the number of overcurrent generations is smaller than the preset number of times.

In one example, when the battery power output mode is terminated, the battery controller may end the battery power output mode when the number of overcurrent generations is equal to the preset number of times.

In one example, the electrified vehicle may further include a link capacitor connected to the input terminal of the inverter and a bidirectional DC/DC converter connected between the link capacitor and a battery.

In addition, according to one embodiment of the present disclosure, there may be provided a method of controlling an electrified vehicle, the method including setting a level of a target voltage and entering a battery power output mode by adjusting a level of an AC voltage output from an output terminal of an inverter to the level of the target voltage, determining whether an overcurrent is generated based on a maximum instantaneous current output from the output terminal of the inverter while the battery power output mode is performed, up-counting the number of overcurrent generations and terminating the battery power output mode when it is determined that the overcurrent has been generated, determining whether to re-enter the battery power output mode based on the number of overcurrent generations when the battery power output mode is terminated, and resetting the level of the target voltage in response to the number of overcurrent generations and re-entering the battery power output mode when it is determined to re-enter the battery power output mode.

In one example, the performing of the battery power output mode may be performed to determine that the overcurrent has been generated when the maximum instantaneous current output from the output terminal of the inverter exceeds a preset value.

In one example, the determining of whether to re-enter may be performed to determine to re-enter the battery power output mode when the number of overcurrent generations is smaller than the preset number of times.

In one example, the determining of whether to re-enter may be performed to determine not to re-enter the battery power output mode when the number of overcurrent generations is equal to the preset number of times.

In one example, the method may further include ending the battery power output mode when it is determined not to re-enter the battery power output mode.

In one example, the re-entering of the battery power output mode may be performed to set the level of the target voltage to be lower as the number of overcurrent generations increases.

In one example, when the number of overcurrent generations is larger than the initial number of times, the performing of the battery power output mode may be performed to down-count the number of overcurrent generations whenever a state in which the maximum instantaneous current output from the output terminal of the inverter is the preset value or less for a set time interval is maintained.

According to embodiments of the present disclosure, it is possible to adjust an output voltage of a battery charging device to re-enter a battery power output mode and then restore the output voltage in terminating the battery power output mode because an overcurrent is generated in the battery charging device in the battery power output mode, thereby performing the battery power output mode even when the overcurrent is generated in the battery charging device.

The effects that may be obtained from embodiments of the present disclosure are not limited to the above-described effects, and other effects not mentioned will be clearly understood by those skilled in the art to which the present disclosure pertains from the following description.

BRIEF DESCRIPTION OF THE DRAWINGS

The above and other objects, features and other advantages of embodiments of the present disclosure will be clearly understood from the following detailed description when taken in conjunction with the accompanying drawings, in which:

FIG. 1 is a table for describing a method of determining an overcurrent of a battery charging device in a battery power output mode according to one embodiment of the present disclosure;

FIG. 5 is a table for describing a level of a target voltage set according to the number of overcurrent generations in FIG. 4.

DETAILED DESCRIPTION OF ILLUSTRATIVE EMBODIMENTS

Figure 2:
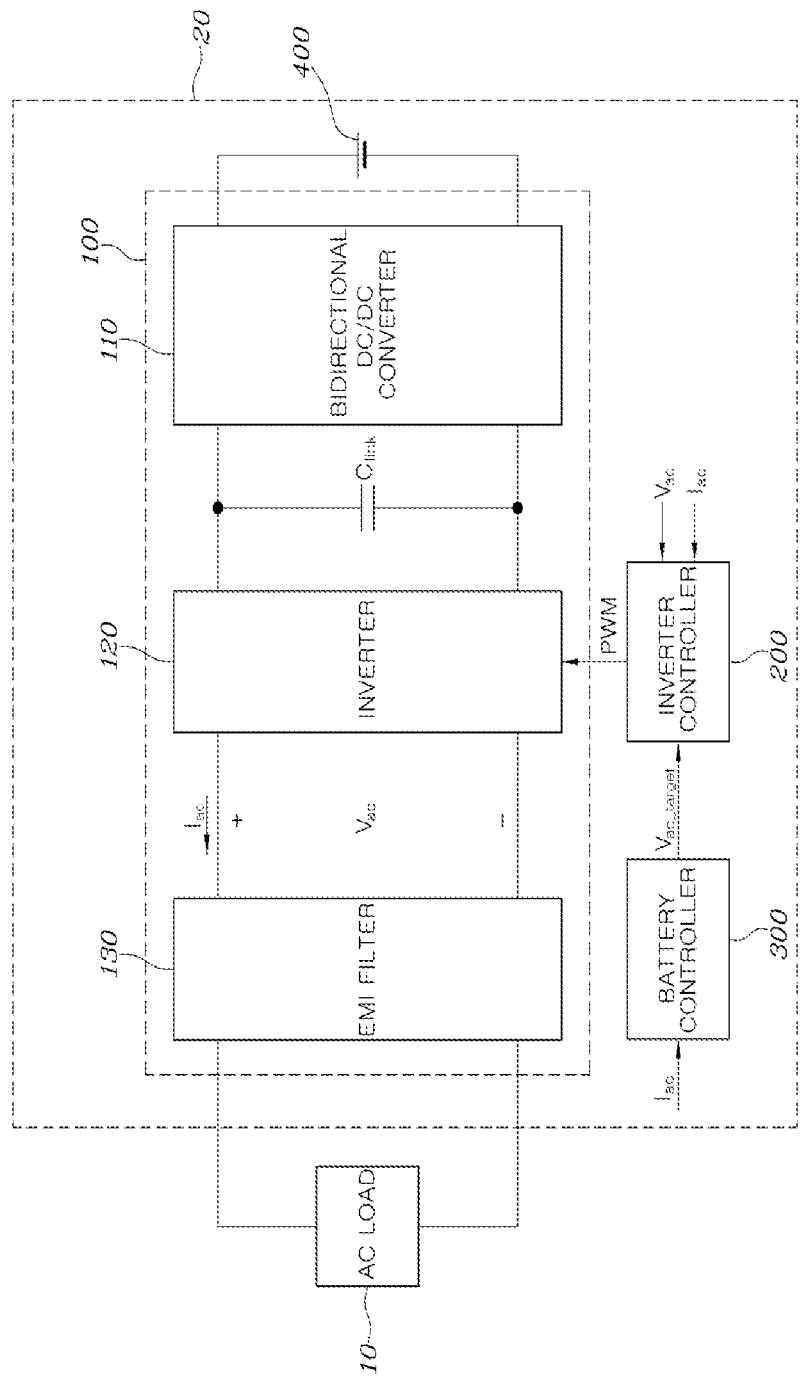
FIG. 2 is a block view showing a configuration of a battery charging system according to one example of the present disclosure.

In the description of the following embodiments, the term "preset" means that when a parameter is used in a process or algorithm, a value of the parameter is predetermined. The value of the parameter may be set when the process or algorithm is started, or set during a period in which the process or algorithm is performed according to embodiments.

Terms such as "first" and "second" used to distinguish various components are not limited by the components. For example, a first component may be named a second component, and conversely, the second component may be named the first component.

It should be understood that when one component is "connected" or "coupled" to another component, it may be directly connected or also connected with other components interposed therebetween. On the other hand, it should be understood that descriptions of "directly connected" and "directly coupled" mean that one component is directly connected to another component without other components interposed therebetween.

Hereinafter, the present disclosure will be described in more detail through embodiments. These embodiments are only for exemplifying the present disclosure, and the scope of the present disclosure is not limited by these embodiments.

In the following description, it is assumed that the electrified vehicle is the electric vehicle (EV), but this is for convenience of description, and the present disclosure is not necessarily limited thereto and may also be applied to any type of electrified vehicle such as a hybrid electric vehicle (HEV) or a hydrogen fuel cell electric vehicle (FCEV) as long as the electrified vehicle is mounted with a battery to output the power of the battery to an external load.

FIG. 1 is a table for describing a method of determining an overcurrent of a battery charging device in a battery power output mode according to one embodiment of the present disclosure. As shown in FIG. 1, a battery charging device may determine whether an overcurrent is generated according to the range of the maximum instantaneous current (Apeak) output therefrom, and when it is determined that the overcurrent is generated, a battery power output mode may be allowed for a certain time or immediately terminated.

More specifically, when the maximum instantaneous current (Apeak) output from the battery charging device exceeds a rated current×110(%) and is the rated current×150(%) or less, the battery power output mode is maintained for 1 s and then terminated. In other words, when the corresponding condition is maintained for 1 s, the battery power output mode may be terminated. Likewise, when the maximum instantaneous current (Apeak) exceeds the rated current×150(%) and is a preset protection specification value or less, the battery power output mode may be maintained for 500 ms and then terminated, and when the maximum instantaneous current (Apeak) exceeds the preset protection specification value, the battery power output mode may be terminated immediately.

When the overcurrent is determined in the above manner to terminate the battery power output mode, the battery charging device may be effectively protected. However, a phenomenon in which the overcurrent flows only at an initial stage of driving a load depending on the type of load (e.g., motors) connected in the battery power output mode may occur. Accordingly, one embodiment of the present disclosure proposes that the battery power output mode may be performed even when the overcurrent is detected in the battery charging device in the battery power output mode in the above-described method. A structure therefor is shown in FIG. 2.

FIG. 2 is a block view showing a configuration of a battery charging system according to one embodiment of the present disclosure. As shown in FIG. 2, the battery charging system may include an AC load 10 and an electric vehicle 20. The electric vehicle 20 may include a battery charging device 100, an inverter controller 200, a battery controller 300, and a battery 400.

The battery charging device 100 may include a bidirectional DC/DC converter 110, a link capacitor $C_{link}$, an inverter 120, and an EMI filter 130. The battery charging device 100 may convert a DC voltage of the battery 400 into an AC voltage while the battery power output mode is performed to supply power to the AC load 10. In addition, when an AC power source (not shown) is applied to the vehicle 20 instead of the AC load 10, the battery charging device 100 may convert the voltage of the AC power source into the DC voltage to charge the battery 400.

The bidirectional DC/DC converter 110 may be connected between the link capacitor $C_{link}$ and the battery 400. The bidirectional DC/DC converter 110 may reduce the DC voltage of the battery 400 to provide the reduced DC voltage to the link capacitor $C_{link}$, and boost the voltage of the link capacitor $C_{link}$ to provide the boosted voltage to the battery 400.

The link capacitor $C_{link}$ may be connected between input terminals of the inverter 120.

The inverter 120 may convert the DC voltage of the link capacitor $C_{link}$ connected to the input terminal into an AC voltage $V_{ac}$ based on a pulse width modulation control signal PWM to output the AC voltage $V_{ac}$ to an output terminal. When the AC load 10 is connected to the electric vehicle 20, the inverter 120 may output the AC $I_{ac}$ to the AC load 10 based on the AC voltage $V_{ac}$.

The EMI filter 130 may remove electrical noises to supply normal power to the AC load 10.

The inverter controller 200 may control a duty ratio of the pulse width modulation control signal PWM to adjust a level of the AC voltage $V_{ac}$ to a level of a target voltage $V_{ac\_target}$ based on the target voltage $V_{ac\_target}$. More specifically, the inverter controller 200 may control the duty ratio of the pulse width modulation control signal PWM based on a result of comparing the level of the target voltage $V_{ac\_target}$ and the level of the AC voltage $V_{ac}$. In addition, the inverter controller 200 may control the duty ratio of the pulse width modulation control signal PWM by detecting the AC $I_{ac}$ output from the inverter 120. A configuration and operation method of the inverter controller 200 will be described in detail later with reference to FIG. 3.

The battery controller 300 may measure the maximum instantaneous current output from the output terminal of the inverter 120 by detecting the AC $I_{ac}$ output from the inverter 120. The battery controller 300 may determine whether an overcurrent is generated based on the maximum instantaneous current output from the output terminal of the inverter 120, and terminate the battery power output mode when the overcurrent is generated. More specifically, the battery controller 300 may determine that the overcurrent is generated when the maximum instantaneous current output from the output terminal of the inverter 120 exceeds a preset value (e.g., each condition shown in FIG. 1) in the battery power output mode, and terminate the battery power output mode. Conversely, when the maximum instantaneous current output from the output terminal of the inverter 120 is smaller than or equal to the preset value, the battery controller 300 may determine that the overcurrent has not been generated and perform the battery power output mode.

When determining that the overcurrent has been generated based on the maximum instantaneous current output from the output terminal of the inverter 120, the battery controller 300 terminates the battery power output mode and up-counts the number of overcurrent generations by '1'.

When the battery power output mode is terminated, the battery controller 300 may determine whether to re-enter the battery power output mode based on the counted number of overcurrent generations. Here, the preset number of times may be set to a natural number of '2' or more. More specifically, when the battery power output mode is terminated, the battery controller 300 may re-enter the battery power output mode when the number of overcurrent generations is smaller than the preset number of times. Conversely, when the battery power output mode is terminated, the battery controller 300 may end the battery power output mode in order to confirm the overcurrent generation diagnosis when the number of overcurrent generations is equal to the preset number of times. For example, when the preset number of times is set to '3', the battery controller 300 may re-enter the battery power output mode until the number of overcurrent generations corresponds to '2'.

The battery controller 300 may output the target voltage $V_{ac\_target}$ having a level corresponding to the number of overcurrent generations in the battery power output mode. More specifically, the battery controller 300 may set the level of the target voltage $V_{ac\_target}$ to be lower as the number of generations of the overcurrent increases. For example, when the number of overcurrent generations corresponds to '0', the battery controller 300 may set the level of the target voltage $V_{ac\_target}$ as a first set voltage. In addition, when the number of overcurrent generations corresponds to '1', the battery controller 300 may set the level of the target voltage $V_{ac\_target}$ to a second set voltage having a level lower than the level of the first set voltage. Accordingly, the battery controller 300 may set the level of the target voltage $V_{ac\_target}$ to be low by up-counting the number of overcurrent generations whenever the battery controller 300 terminates and re-enters the battery power output mode.

When the number of overcurrent generations is greater than the initial number of times while the battery power output mode is performed, the battery controller 300 may down-count the number of overcurrent generations by '1' whenever a state in which the maximum instantaneous current output from the output terminal of the inverter 120 is the preset value or less is maintained for a set time interval. Here, the initial number of times may be set to '0'. For example, when the number of overcurrent generations is '0' or more and the set time interval is set to 50 ms, the battery controller 300 may down-count the number of overcurrent generations by '1' whenever the state in which the maximum instantaneous current output from the output terminal of the inverter 120 is the preset value or less is maintained for 50 ms. Accordingly, the battery controller 300 may re-enter the battery power output mode and then restore the output voltage of the battery charging device 100 step by step.

As described above, the battery controller 300 may adjust the output voltage of the battery charging device 100 to re-enter the battery power output mode and then restore the output voltage in terminating the battery power output mode because an overcurrent is generated in the battery charging device 100 in the battery power output mode, thereby performing the battery power output mode even when the initial overcurrent is generated in the battery charging device 100 by load characteristics.

Figure 3:
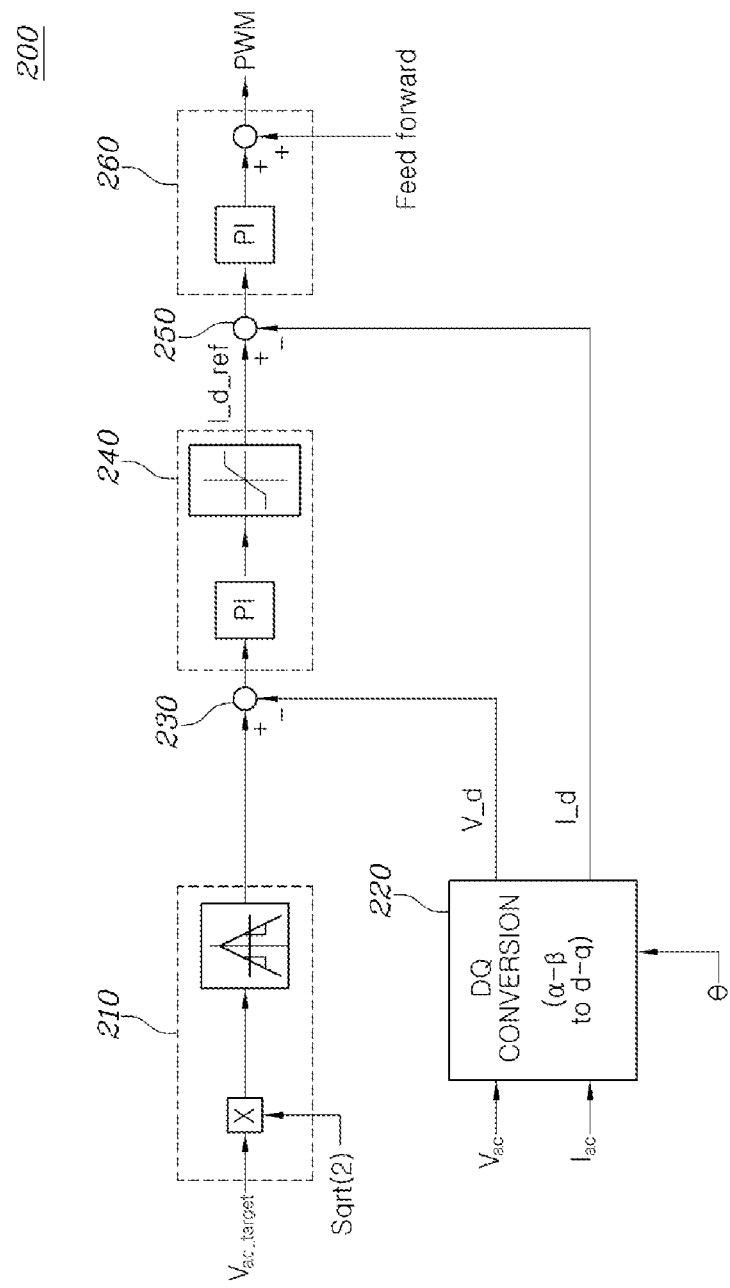
FIG. 3 is a view showing an example of a configuration of an inverter controller shown in FIG. 2.

FIG. 3 is a view showing an example of a configuration of the inverter controller 200 shown in FIG. 1. As shown in FIG. 3, the inverter controller 200 may include a voltage command setting circuit 210, a DQ converter 220, a voltage comparator 230, a voltage controller 240, a current comparator 250, and a current controller 260.

The voltage command setting circuit 210 may multiply the target voltage $V_{ac\_target}$ having a root mean square (RMS) value for the AC voltage $V_{ac}$ by (sqrt(2)), and output a triangular wave having a value obtained by multiplying the target voltage $V_{ac\_target}$ by (sqrt(2)) as the maximum amplitude to one end of the voltage comparator 230.

The DQ converter 220 may convert each of the AC voltage $V_{ac}$ and the AC $I_{ac}$ output from the output terminal of the inverter (120 in FIG. 2) into DQ coordinates based on a phase angle θ to calculate a converted voltage V_d and a converted current I_d.

The voltage comparator 230 may output a signal having a value corresponding to a difference between the triangular wave output from the voltage command setting circuit 210 and the converted voltage V_d to the voltage controller 240.

The voltage controller 240 may reduce an error of a signal input from the voltage comparator 230 through a proportional-integral (PI) control. In addition, the voltage controller 240 may output a value calculated through PI (Proportional-Integral) control as a reference current I_d_ref by limiting the waveform through a limiter.

The current comparator 250 may output a signal having a value corresponding to a difference between the reference current I_d_ref and the converted current I_d to the current controller 260.

The current controller 260 may reduce the error of the signal from the voltage comparator 230 through proportional-integral (PI) control. In addition, the current controller 260 may output a pulse width modulation control signal PWM by adding a feed forward value to a value calculated through the proportional integral (PI) control.

Figure 4:
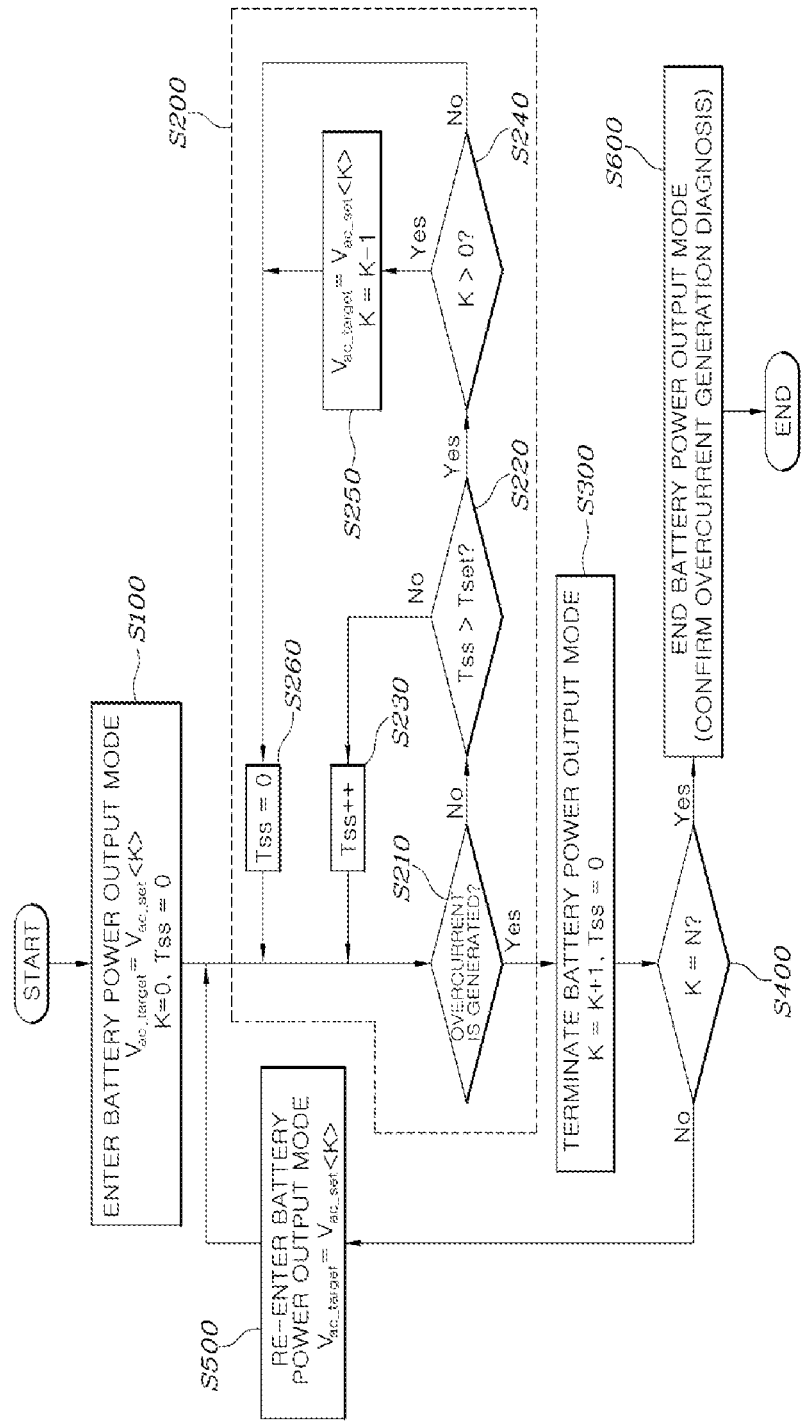
FIG. 4 is a flowchart for describing a method of controlling an electric vehicle shown in FIG. 2.

FIG. 4 is a flowchart for describing a method of controlling the electric vehicle 20 shown in FIG. 2. As shown in FIG. 4, the method of controlling the electric vehicle 20 may include an operation of entering the battery power output mode (S100), an operation of determining whether an overcurrent is generated (S200), an operation of terminating the battery power output mode (S300), an operation of determining whether to re-enter the battery power output mode (S400), an operation of re-entering the battery power output mode (S500), and an operation of terminating the battery power output mode (S600).

The 'K', 'N', 'Tss', 'Tset' and '$V_{ac\_target}$<K>' shown in FIG. 4 refer to 'the number of overcurrent generations', 'the preset number of times', 'an overcurrent non-generation maintenance time', 'a set time interval', and 'set voltage'. A level of the set voltage ('$V_{ac\_set}$<K>') is set to be lower as the number of overcurrent generations ('K') increases.

In the operation of entering the battery power output mode (S100), the battery controller 300 may set the level of the target voltage $V_{ac\_target}$ which is the preset target output voltage, to a first set voltage $V_{ac\_set}$<0>. The inverter controller 200 may adjust the level of the AC voltage $V_{ac}$ output from the output terminal of the inverter 120 to the first set voltage $V_{ac\_set}$<0> based on the target voltage $V_{ac\_target}$.

In the operation of determining whether overcurrent is generated (S200), the battery controller 300 may determine whether the overcurrent is generated based on the maximum instantaneous current output from the output terminal of the inverter 120 while the battery power output mode is performed. In addition, when the number of overcurrent generations ('K') is greater than the initial number of times ('0'), the battery controller 300 may down-count the number of overcurrent generations ('K') by '1' whenever the state in which the maximum instantaneous current output from the output terminal of the inverter 120 is the preset value or less for the set time interval Tset is maintained.

More specifically, the operation of determining whether the overcurrent is generated (S200) may include an operation of detecting whether the overcurrent is generated (S210), an operation of determining the overcurrent for each set time interval Tset (S220, S230), an operation of comparing the number of overcurrent generations (K) with the initial number of times ('0') (S240), an operation of restoring the level of the target voltage $V_{ac\_target}$ (S250), and an operation of initializing an overcurrent non-generation maintenance time Tss (S260).

In the operation of detecting whether the overcurrent is generated (S210), the battery controller 300 may detect whether the maximum instantaneous current output from the output terminal of the inverter 120 exceeds a preset value.

The operation of determining the overcurrent for each set time interval Tset (S220, S230) may repeatedly perform the operation of detecting, by the battery controller 300, whether the overcurrent is generated until the overcurrent non-generation maintenance time Tss exceeds the set time interval Tset when the overcurrent is detected as having not been generated in the operation of detecting whether the overcurrent is generated (S210).

When the overcurrent non-generation maintenance time Tss exceeds the set time interval Tset, the battery controller 300 may compare whether the number of overcurrent generations ('K') is greater than the initial number of times ('0') in the operation of comparing the number of overcurrent generations (K) with the initial number of times ('0') (S240).

When the number of overcurrent generations ('K') is greater than the initial number of times ('0'), the battery controller 300 may down-count the number of overcurrent generations ('K') by '1', and reset the level of the target voltage $V_{ac\_target}$ corresponding to the number of generation of down-counted overcurrents ('K') to a set voltage $V_{ac\_set}$<K> in the operation of restoring the level of the target voltage $V_{ac\_target}$ (S250). In other words, in the operation of restoring the level of the target voltage $V_{ac\_target}$ (S250), the battery controller 300 may set the level of the target voltage $V_{ac\_target}$ to be high.

In the operation of initializing the overcurrent non-generation maintenance time Tss (S260), the battery controller 300 may initialize the overcurrent non-generation maintenance time Tss to '0', and repeatedly perform the operation of detecting whether the overcurrent is generated (S210).

The operation of terminating the battery power output mode (S300) may up-count the number of overcurrent generations ('K') by '1' when determining that the overcurrent has been generated in the operation of detecting, by the battery controller 300 whether the overcurrent is generated (S210), and terminate the battery power output mode. At this time, the overcurrent non-generation maintenance time Tss is initialized to 'V'.

In the operation of determining whether to re-enter the battery power output mode (S400), when the battery power output mode is terminated, the battery controller 300 may determine whether to re-enter the battery power output mode based on the number of overcurrent generations ('K'). More specifically, when the number of overcurrent generations ('K') is smaller than the preset number of times ('N'), the battery controller 300 may determine to re-enter the battery power output mode. Conversely, when the number of overcurrent generations ('K') is equal to the preset number of times ('N'), the battery controller 300 may determine not to re-enter the battery power output mode.

In the operation of re-entering the battery power output mode (S500), when the battery controller 300 determines to re-enter the battery power output mode, the battery controller 300 may reset the level of the target voltage $V_{ac\_target}$ to the set voltage $V_{ac\_set}<K>$ in response to the number of up-counted overcurrent generations ('K'). In the operation of re-entering the battery power output mode (S500), the battery controller 300 may set the level of the target voltage $V_{ac\_target}$ to be lower as the number of overcurrent generations ('K') increases.

In the operation of terminating the battery power output mode (S600), when the battery controller 300 determines not to re-enter the battery power output mode, the battery controller 300 may terminate the battery power output mode in order to confirm the overcurrent generation diagnosis.

FIG. 5 is a table for describing the level of the target voltage $V_{ac\_target}$ set according to the number of overcurrent generations ('K') in FIG. 4. In FIG. 5, the preset number of times ('N') for confirming the overcurrent generation diagnosis in the battery power output mode is set to '3'.

When the number of overcurrent generations ('K') corresponds to '0', the level of the target voltage $V_{ac\_target}$ may be set to the first set voltage $V_{ac\_set}<0>$. For example, the level of the first set voltage $V_{ac\_set}<0>$ may be set to 220 (V).

When the number of overcurrent generations ('K') corresponds to '1', the level of the target voltage $V_{ac\_target}$ may be set to a second set voltage $V_{ac\_set}<1>$. The level of the second set voltage $V_{ac\_set}<1>$ may be set to be lower than the level of the first set voltage $V_{ac\_set}<0>$. For example, the level of the second set voltage $V_{ac\_set}<1>$ may be set to 200 (V) which is 20 (V) lower than the level of the first set voltage $V_{ac\_set}<0>$.

When the number of overcurrent generations ('K') corresponds to '2', the level of the target voltage $V_{ac\_target}$ may be set to a third set voltage $V_{ac\_set}<2>$. The level of the third set voltage $V_{ac\_set}<2>$ may be set to be lower than the level of the second set voltage $V_{ac\_set}<1>$. For example, the level of the third set voltage $V_{ac\_set}<2>$ may be set to 180 (V) which is 20 (V) lower than the level of the second set voltage $V_{ac\_set}<1>$.

When the number of overcurrent generations ('K') corresponds to '3', the level of the target voltage $V_{ac\_target}$ may be set to 0 (V), and the battery controller 300 may terminate the battery power output mode in order to confirm the diagnosis that the overcurrent has been generated.

Figure 6:
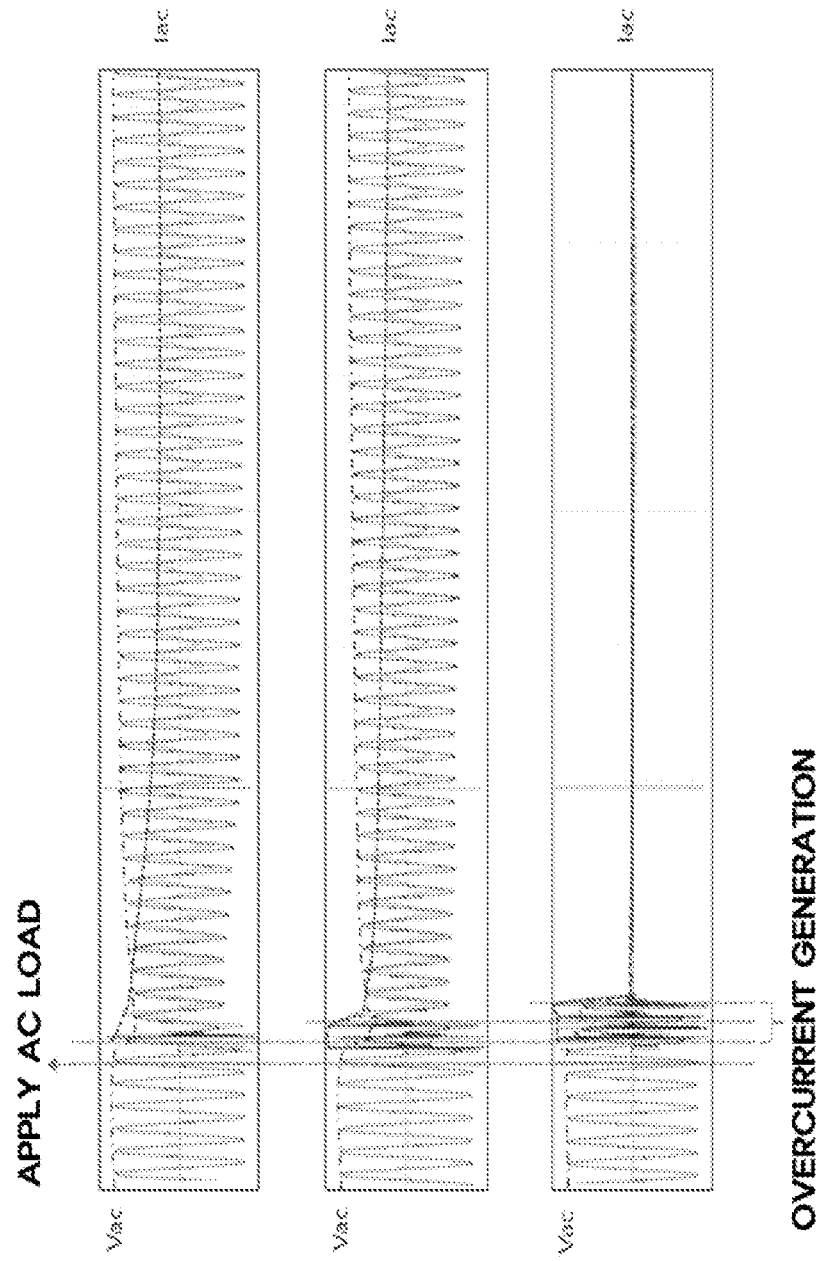
FIG. 6 is a waveform view for describing an operation in which a battery controller shown in FIG. 2 controls the current and voltage output from an inverter according to the number of overcurrent generations.

FIG. 6 is a waveform view for describing an operation in which the battery controller 300 shown in FIG. 2 controls the AC $I_{ac}$ and the AC voltage $V_{ac}$ output from the inverter 120 according to the number of overcurrent generations. The top, middle, and bottom waveform views in FIG. 6 are cases in which the number of overcurrent generations corresponds to '1', '2', and '3', respectively. In FIG. 6, the preset number of times ('N') for confirming the overcurrent generation diagnosis in the battery power output mode is set to '3'.

In the top of FIG. 6, the battery controller 300 may confirm that the overcurrent has been generated once based on the AC $I_{ac}$ output from the inverter 120 after the AC load 10 is connected to the battery charging device 100. When the overcurrent is generated, the battery controller 300 may terminate the battery power output mode, reduce the level of the target voltage $V_{ac\_target}$ for the AC voltage $V_{ac}$ and then re-enter the battery power output mode. Accordingly, the AC $I_{ac}$ converges to a steady state. In addition, when the overcurrent is not generated for the set time interval after the battery controller 300 re-enters the battery power output mode, the battery controller 300 may restore the level of the target voltage $V_{ac\_target}$ for the AC voltage $V_{ac}$.

In the middle of FIG. 6, unlike the case of the top, it may be confirmed that the overcurrent has been generated to re-enter the battery power output mode, but the overcurrent has been generated once more. At this time, the battery controller 300 may terminate the battery power output mode when a second overcurrent is generated, reduce the level of the target voltage $V_{ac\_target}$ for the AC voltage $V_{ac}$ again, and then re-enter the battery power output mode. Accordingly, the AC $I_{ac}$ converges to the steady state, and the level of the target voltage $V_{ac\_target}$ may be restored step by step.

In the case of the bottom of FIG. 6, it may be confirmed that the overcurrent has been generated three times after the AC load 10 is connected to the battery charging device 100. Unlike the cases of the top and the middle, the battery controller 300 may end the battery power output mode in order to confirm the diagnosis that the overcurrent has been generated when a third overcurrent is generated.

According to the embodiments of the present disclosure described so far, it is possible to effectively drive the load that generates the overcurrent at the initial stage of driving, such as motors, in the battery power output mode. However, in the embodiments of the present disclosure, it goes without saying that the battery output mode is terminated after the output voltage of the battery charging device is adjusted by the preset number of times for confirming the overcurrent generation diagnosis even when the internal short circuit as well as the overcurrent according to the load characteristics is generated or the overcurrent irrelevant to the load characteristics is generated, thereby effectively protecting hardware.

Meanwhile, embodiments of the present disclosure described above may be implemented in a medium in which a program is recorded as computer-readable codes. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, etc. Accordingly, the above detailed description should not be construed limitedly and should be considered as being illustrative in all respects. The scope of the present disclosure should be determined by a reasonable construction of the appended claims, and all changes within the equivalent scope of the present disclosure are included in the scope of the present disclosure.

What is claimed is:

1. An electrified vehicle comprising:
an inverter configured to convert a DC voltage of an input terminal into an AC voltage based on a pulse width modulation control signal to output the AC voltage to an output terminal;
an inverter controller configured to control a duty ratio of the pulse width modulation control signal in order to adjust a level of the AC voltage to a level of a target voltage based on the target voltage; and
a battery controller configured to:
determine whether an overcurrent is generated based on a maximum instantaneous current output from the output terminal of the inverter in a battery power output mode and terminate the battery power output mode when the overcurrent is generated;
determine whether to re-enter the battery power output mode based on a number of overcurrent generations when the battery power output mode is terminated;
set the level of the target voltage in response to the number of overcurrent generations and re-enter the battery power output mode when it is determined that the number of overcurrent generations is smaller than a preset number of times; and
end the battery power output mode when it is determined that the number of overcurrent generations is equal to the preset number of times.

2. The electrified vehicle of claim 1, wherein the inverter controller is configured to control the duty ratio of the pulse width modulation control signal based on a result of comparing the level of the target voltage and the level of the AC voltage.

3. The electrified vehicle of claim 1, wherein the battery controller is configured to set the level of the target voltage to be lower as the number of overcurrent generations increases.

4. The electrified vehicle of claim 3, wherein the battery controller is configured to:
determine that the overcurrent has been generated when the maximum instantaneous current output from the output terminal of the inverter exceeds a preset value in the battery power output mode; and
up-count the number of overcurrent generations.

5. The electrified vehicle of claim 4, wherein when the number of overcurrent generations is larger than an initial number of times in the battery power output mode, the battery controller is configured to down-count the number of overcurrent generations whenever a state in which the maximum instantaneous current output from the output terminal of the inverter is the preset value or less for a set time interval is maintained.

6. The electrified vehicle of claim 1, further comprising:
a link capacitor connected to the input terminal of the inverter; and
a bidirectional DC/DC converter connected between the link capacitor and a battery.

7. A method of controlling an electrified vehicle, the method comprising:
setting a level of a target voltage and entering a battery power output mode by adjusting a level of an AC voltage output from an output terminal of an inverter to the level of the target voltage;
determining whether an overcurrent is generated based on a maximum instantaneous current output from the output terminal of the inverter while the battery power output mode is performed;
up-counting a number of overcurrent generations and terminating the battery power output mode when it is determined that the overcurrent has been generated;
determining whether to re-enter the battery power output mode based on the number of overcurrent generations when the battery power output mode is terminated;
resetting the level of the target voltage in response to the number of overcurrent generations and re-entering the battery power output mode when it is determined that the number of overcurrent generations is smaller than a preset number of times; and
ending the battery power output mode when it is determined that the number of overcurrent generations is equal to the preset number of times.

8. The method of claim 7, wherein determining whether the overcurrent is generated is performed to determine that the overcurrent has been generated when the maximum instantaneous current output from the output terminal of the inverter exceeds a preset value.

9. The method of claim 7, wherein re-entering the battery power output mode is performed to set the level of the target voltage to be lower as the number of overcurrent generations increases.

10. The method of claim 7, wherein when the number of overcurrent generations is larger than an initial number of times, determining whether the overcurrent is generated is performed to down-count the number of overcurrent generations whenever a state in which the maximum instantaneous current output from the output terminal of the inverter is a preset value or less for a set time interval is maintained.

* * * * *